US010242101B2

(12) United States Patent
Saini et al.

(10) Patent No.: US 10,242,101 B2
(45) Date of Patent: Mar. 26, 2019

(54) AUTOMATIC IDENTIFICATION OF SOURCES OF WEB METRIC CHANGES

(71) Applicant: Adobe Systems Incorporated, San Jose, CA (US)

(72) Inventors: Shiv Kumar Saini, Rajasthan (IN); Ritwik Sinha, Kolkata (IN); Iftikhar Ahamath Burhanuddin, Chennai (IN); John B. Bates, Highland, UT (US)

(73) Assignee: Adobe Inc., San Jose, CA (US)

( * ) Notice: Subject to any disclaimer, the term of this patent is extended or adjusted under 35 U.S.C. 154(b) by 573 days.

(21) Appl. No.: 14/526,149

(22) Filed: Oct. 28, 2014

(65) Prior Publication Data

US 2016/0117389 A1   Apr. 28, 2016

(51) Int. Cl.
*G06F 17/30* (2006.01)

(52) U.S. Cl.
CPC .... *G06F 17/30864* (2013.01); *G06F 17/3089* (2013.01)

(58) Field of Classification Search
CPC ......... G06F 17/30864; G06F 17/30867; G06F 17/30991; G06F 17/30696; G06Q 30/02
USPC ....................................................... 707/722
See application file for complete search history.

(56) References Cited

U.S. PATENT DOCUMENTS

| | | | | |
|---|---|---|---|---|
| 6,839,680 B1* | 1/2005 | Liu | ......................... | G06Q 30/02 705/7.33 |
| 2004/0190448 A1* | 9/2004 | Fishteyn | ............ | G06Q 30/0247 370/229 |
| 2007/0143343 A1* | 6/2007 | Iverson | ............... | G06F 17/3089 707/999.107 |
| 2008/0086741 A1* | 4/2008 | Feldman | ................ | G06Q 30/02 725/13 |
| 2008/0189254 A1* | 8/2008 | Cancel | ................... | G06Q 30/02 707/3 |
| 2010/0153544 A1* | 6/2010 | Krassner | ............ | G06F 17/2247 709/224 |
| 2010/0257026 A1* | 10/2010 | Brocklebank | .......... | G06Q 10/06 705/7.31 |
| 2011/0055214 A1* | 3/2011 | Mui | .................. | G06F 17/30554 707/737 |
| 2011/0119374 A1* | 5/2011 | Ruhl | ................... | G06F 17/3089 709/224 |
| 2013/0205020 A1* | 8/2013 | Broda | ................. | G06F 11/3495 709/224 |

* cited by examiner

*Primary Examiner* — Pierre M Vital
*Assistant Examiner* — Andrew N Ho
(74) *Attorney, Agent, or Firm* — Wolfe-SBMC

(57) ABSTRACT

Techniques for automatic identification of sources of web metric changes are described. In one or more implementations, changes in a web metric that indicate a measurable attribute associated with a website are determined, and the web metric is analyzed to identify sources that contributed to the changes in the web metric. In implementations, data is queried to obtain actual values for dimension elements along one or more dimensions of the web metric. In addition, expected values for the dimension elements are estimated along the dimensions of the web metric based on historical data. Then, deviations between the actual values and the expected values are calculated by using comparable statistics. Subsequently, the comparable statistics can be analyzed to identify corresponding dimension elements as the sources that contributed to the changes in the web metric.

20 Claims, 5 Drawing Sheets

AUTOMATIC IDENTIFICATION OF SOURCES OF WEB METRIC CHANGES

BACKGROUND

Web analytics is the measurement, collection, analysis, and reporting of web data for purposes of understanding and optimizing web usage. Generally, tools used for web analytics can provide hundreds of reports that summarize thousands of measurable attributes (web metrics), such as for example, the number of visitors to a website, the number of page views, revenue generated via the website, and so on. Reviewing all of these reports can be costly both in time and resources, and a user is likely to miss important information and patterns in the web data.

SUMMARY

Techniques for automatic identification of sources of web metric changes are described. In one or more implementations, changes in a web metric that indicate a measurable attribute associated with a website are determined, and the web metric is analyzed to identify sources, or factors, that contributed to the changes in the web metric. For example, a variety of factors can be used to describe visitors to a website. However, some of the factors may generally not be comparable, such as country of visitor to the website, browser type used to access the website, age of the visitor, and so on. To enable comparison across different factors, the factors are assigned values, and deviations between actual and expected values for each factor during a time period are calculated. Then, the deviations are transformed into comparable values and compared across different factors. Based on the comparisons, a determination is made as to which factors contributed most to the changes in the web metric.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
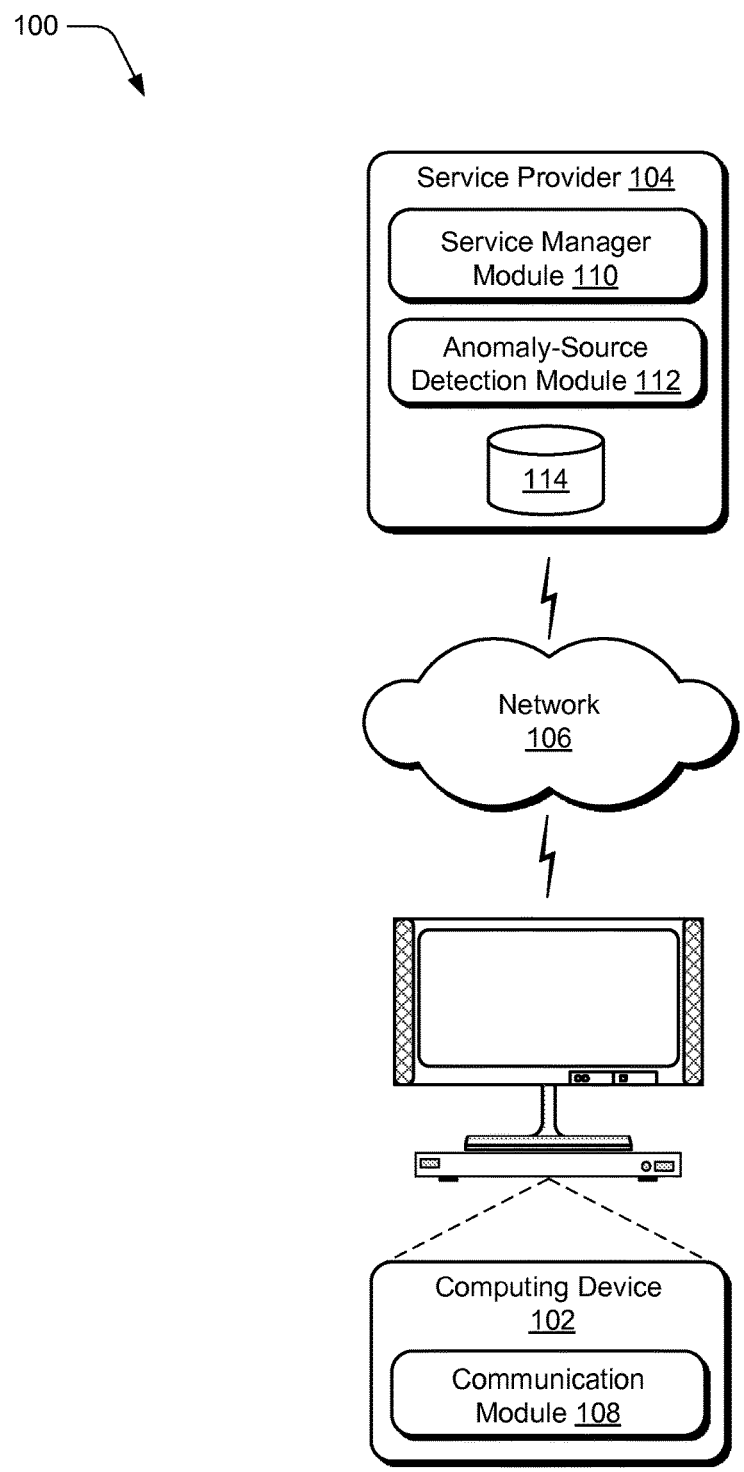
FIG. 1 is an illustration of an environment in an example implementation that is operable to employ techniques for automatic identification of sources of web metric changes.

Conventional techniques used for analyzing web metrics can be time consuming and burdensome based on the sheer amount of data provided by web analytics tools. For example, tools used for web analytics can provide hundreds of reports that summarize tens to hundreds of thousands of measurable attributes associated with a website. Reviewing and/or analyzing these reports could take weeks, and a user may be likely to miss important information and patterns in the reports.

Techniques involving automatic identification of sources of web metric changes are described. In the following discussion, a variety of different implementations are described that involve automatic identification of sources of web metric changes. In one example, a change is identified in a web metric that indicates a measureable attribute associated with a website. For example, a sudden decrease in revenue generated by the website may be identified. In order to identify one or more sources that contributed to the change, data is queried to obtain actual values for dimension elements along various dimensions of the web metric during a time period when the change occurred. In addition, expected values for the dimension elements during the time period when the change occurred are estimated along the various dimensions of the web metric based on historical data. Further, deviations are calculated between the actual values and the expected values by using comparable statistics. Using the comparable statistics, the deviations are compared to identify corresponding dimension elements that contributed to the change to the web metric.

The implementations described herein provide the ability for a user (e.g., website developer, website monitor, website manager, and so on) monitoring a website to easily identify top-contributing factors to changes in behavior of various web metrics. The user can then utilize this information for a variety of purposes, such as to improve a campaign design associated with the website. Using the techniques described herein, the user monitoring a website can, for example, identify not only which factors contributed most to the change in behavior of the web metric, but also how much of the change in behavior was caused by each factor. Further, the techniques described herein can be performed within seconds rather than days or weeks, to analyze all the reports, thereby saving a substantial amount of time for user.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures. Example equations are then described which may be used to perform the example procedures.

As employed herein, the term "application" may refer to computer software that causes a computer to perform useful tasks. Some examples of applications can include a software application, an application program, a mobile app, a desktop application, and so on. Additional examples of applications include web browsers, email programs, word processors, games, utilities, social networking applications, instant messaging applications, and so on. In at least some embodiments, an application may represent a service that is accessible over a network, such as a cloud based service, a distributed application, and so forth. Thus, an application is not limited to functionalities installed locally on a client device.

As employed herein the term "web metric" is representative of a measurable attribute associated with a website. A web metric can include a number of page views, number of visitors, revenue generated by the website, number of units sold, number of prior visits by visitors, number of clicks by visitors, number of logins, length of visits, and so on. Thus, the term "web metric" can represent any of a variety of metrics associated with a website.

As employed herein, the term "dimension" is representative of a categorical variable associated with a web metric. Some examples of dimensions include a country of a visitor to the website, various demographics of the visitor, a browser type used by the visitor to access the website, an operating system used by the visitor when accessing the website, referring websites, demographic and/or geographic information about a visitor, and so on. Thus, the term "dimension" can represent any of a variety of categorical variables associated with the website. In addition, each dimension can be further partitioned into dimension elements, which are representative of values associated with a corresponding dimension. For example, the dimension may represent a country category, whereas the dimension elements represent different countries.

As employed herein, the term "control period" is representative of a time duration in which values associated with various dimensions and corresponding dimension elements of a web metric are obtained. In implementations, the control period represents a historical time duration or pattern of time (e.g., Mondays of the past month) used to collect the values of the dimension elements. The control period can be used to establish patterns in behavior of the various dimensions and corresponding dimension elements of the web metric.

As employed herein, the term "anomaly" is representative of a deviation in expected behavior. For example, an anomaly in a web metric can include an unexpected decrease in page views of a web page, or an unexpected increase in revenue generated by the website. In addition, an "anomaly period" is representative of a time duration in which the anomaly is observed, such as a one or more hours, days, weeks, and so on. Further examples of the above-described terms may be found in relation to the following discussion.

Example Environment

FIG. 1 is an illustration of an environment 100 in an example implementation that is operable to employ techniques described herein. The illustrated environment 100 includes a computing device 102 and a service provider 104 that are communicatively coupled via a network 106. The computing device 102 as well as computing devices that implement the service provider 104 may be configured in a variety of ways.

The computing devices, for example, may be configured as a desktop computer, a laptop computer, a mobile device (e.g., assuming a handheld configuration such as a tablet or mobile phone), and so forth. Additionally, a computing device may be representative of a plurality of different devices, such as multiple servers of the service provider 104 utilized by a business to perform operations "over the cloud" as further described in relation to FIG. 5.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be representative of multiple networks.

The computing device 102 is also illustrated as including a communication module 108. The communication module 108 is representative of functionality to communicate via the network 106, such as with one or more services of the service provider 104. As such, the communication module 108 may be configured in a variety of ways. For example, the communication module 108 may be configured as a browser that is configured to "surf the web." The communication module 108 may also be representative of network access functionality that may be incorporated as part of an application, e.g., to provide network-based functionality as part of the application, an operating system, and so on. Thus, functionality represented by the communication module 108 may be incorporated by the computing device 102 in a variety of different ways.

The service provider 104 is representative of functionality to provide one or more network—based services. The services are managed by a service manager module 110 to support a variety of different functionality. The services (e.g., web services), for instance, may be configured to support various functionalities associated with a website, such as web traffic tracking and analysis, anomaly detection, anomaly source detection, web metric analysis, and so on. These services can assist users in identifying attributes of the website that positively or negatively affect patterns in visitor behavior. Thus, the service provider 104 can provide any of a variety of different network-based services.

Service manager module 110 is configured to manage processing of data and/or content requested or provided by the computing device 102. In some instances, a user may wish to communicate with the service provider 104 to analyze hundreds of reports having data associated with visitors of a website operated by the user. The service manager module 110 can process the user's request and, if needed, communicate the request to an appropriate entity to properly service the request.

The service provider 104 is also illustrated as including an anomaly-source detection module 112 and storage 114. The anomaly-source detection module 112 is representative of functionality to provide some of the services of the service provider 104, such as to identify a source of an anomaly detected in a web metric for a website. The anomaly-source detection module 112 is configured to analyze the anomaly to estimate expected values and compare the expected values to actual values of the web metric. In addition, the anomaly-source detection module 112 is configured to provide an indication of sources (e.g., factors, attributes, characteristics, etc.) that contributed to the anomaly.

The storage 114 may be a component of the service provider 104, may be remote from the service provider 104, or may be a third-party database. The storage 114 may be a single database, or may be multiple databases, at least some of which include distributed data. Thus, a variety of different types of storage mechanisms can be utilized for the storage 114.

Figure 2:
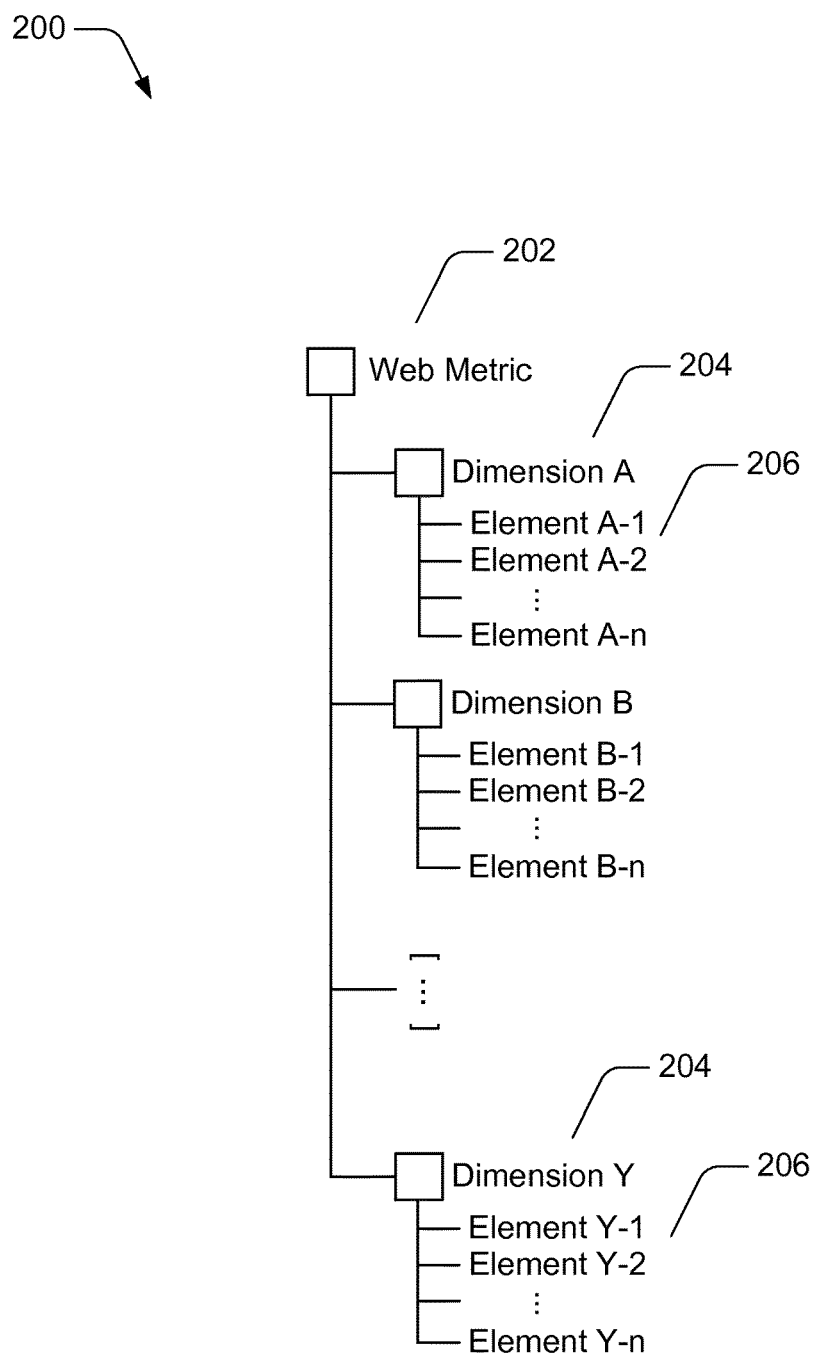
FIG. 2 is an illustration of an example architecture of a web metric used when employing techniques for automatic identification of sources of web metric changes.

FIG. 2 is an illustration of an example implementation 200 of an architecture or structure associated with a web metric that is usable for employing techniques for automatic identification of sources of web metric changes. The illustrated implementation 200 includes a web metric 202 that can be partitioned into various dimensions (e.g., Dimensions A-Y), which can be further partitioned into various dimension elements (e.g., Dimension Elements (A-1)-(A-n)).

As described above, the web metric 202 can be any of a variety of measureable attributes associated with a website. Some example web metrics include a number of page views, a number of visitors, revenue generated by the website, number of referring websites, number of units sold, number of prior visits by visitors, number of clicks by visitors, number of logins, length of visits, keywords used by visitors via a search engine to find the website, and so on. Other examples of web metrics include conversion rate (e.g., an amount of visitors who achieved a goal on the website such as completing a purchase, filling out a contract form, viewing a certain page on the web site, and so on), bounce rate (e.g., rate at which a visitor visits the website and immediately clicks the back button or closes their browser or browser tab), and visitor exit rate (e.g., rate at which a visitor visits multiple pages of the web site and then leaves the web site).

In the example implementation 200, the web metric 202 is divided into multiple dimensions 204 including Dimension A through Dimension Y. Any number of dimensions can be utilized. These dimensions represent categorical variables associated with the web metric. Some examples include country of visitor, channel used by the visitor, and browser type used by the visitor to access the website.

As described above, each dimension of the web metric 202 can be further partitioned into a plurality of dimension elements 206, which represent unordered, non-numeric values associated with the corresponding dimension. Any number of dimension elements can be utilized. For example, Dimension A is partitioned into dimension elements A-1 through A-n. If dimension A corresponds to a country category, then the dimension elements can represent different countries, such as Mexico, Canada, India, the United States of America, and so on. Another example includes a dimension corresponding to a type of channel used by visitors to the website, and the corresponding dimension elements can represent a paid search channel, a social channel, and so on. Additionally, the dimension can represent a browser category, and corresponding dimension elements can represent various different browser types, such as Firefox™, Safari™, Google Chrome™, and so on.

In an example, a web site can track a variety of web metrics associated with the web site that can be partitioned into hundreds of dimensions, which can be further partitioned into potentially thousands of dimension elements. Accordingly, a single website can have tens to hundreds of thousands of dimension elements to measure, any of which can contribute to deviations in the web metrics.

Consider an example in which a website owner identifies an anomaly in expected behavior of a web metric, such as a significant decrease in page views of the website. To identify a source of the anomaly, an expected distribution of the metric along dimension elements of various dimensions is estimated. For example, the number of page views of the website expected from each country can be estimated and compared to actual page views from respective countries to identify deviations in normal or patterned behavior for each country.

Given the expected distribution of dimension elements, the deviations can be obtained by subtracting the expected distribution from the actual distribution of the metric. However, these deviations in dimension elements are not directly comparable using conventional techniques and generally cannot be compared across different dimensions, such as across country, browser type, and channel, to identify which dimension elements contributed most to the anomaly. For example, deviations in country are generally not comparable with deviations in browser type because these deviations are based on different factors and the estimation process for each of these dimensions introduces different errors that depend on the base as well as a number of dimension elements in each dimension. Using the techniques described herein, however, these dimensions are converted into values that are comparable across the dimensions, further discussion of which is provided below.

Example Procedures

The following discussion describes techniques for automatic identification of sources of web metric changes that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. Further, although various different procedures are described herein, a combination of the described procedures may be employed to implement the techniques described herein. In portions of the following discussion, reference will be made to the environment 100 of FIG. 1.

Figure 3:
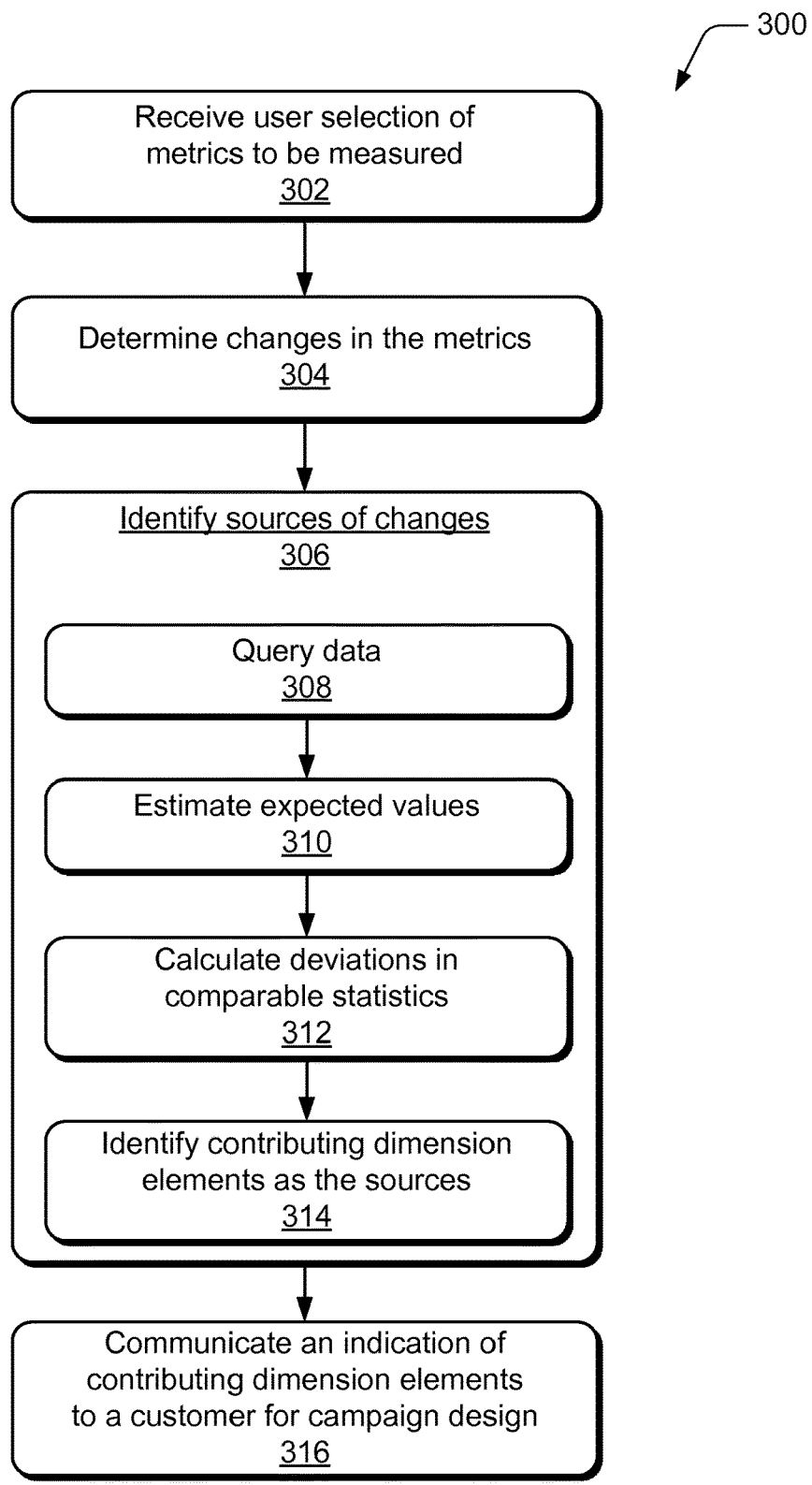
FIG. 3 is a flow diagram depicting a procedure in an example implementation in which techniques for automatic identification of sources of web metric changes are employed.

FIG. 3 is a flow diagram depicting a procedure 300 in an example implementation in which techniques for automatic identification of sources of web metric changes are employed. A user selection of metrics to be measured is received (block 302). In implementations, a user can select which metrics associated with the user's website to measure. Some example metrics include web traffic such as a number of page views, bounces, exits, clicks on a page of the website, and so on. In at least one approach, the user selection of the metric(s) can be received at the anomaly-source detection module 112 of the service provider 104 in FIG. 1.

Changes in the metrics are determined (block 304). For example, changes (e.g., anomalies) in behavior can be discovered, such as a significant decrease in the number of page views on the website, or a significant drop in revenue generated by the website. Upon discovering such anomalies, the user might be interested in determining a source of the changes in the metrics.

One or more sources of the changes to the metrics are identified (block 306). This step can be performed in any suitable way. In implementations, the changes to the metrics are identified at least via blocks 308-314. For example, data is queried (block 308). The data can include historical data related to the metric including the metric's dimensions and corresponding dimension elements. In at least some implementations, the data can be queried over a particular duration of time, such as the past several days or weeks, or certain days of each of the past several weeks. This particular duration of time can be referred to as a control period, which can be used to identify patterns in behavior of the dimension elements of each dimension of the metric.

In addition, the data can include actual values associated with the dimension elements during a time period when the change occurred (e.g., an anomaly period). In at least some implementations, an assumption is made that a weekly seasonality should be similar to the same weekday from past weeks. For example, if the number of page views for a particular website on Thursdays is generally 10,000 views, the website owner can assume that this next Thursday will also experience approximately 10,000 page views. However, if the website owner noticed that this Thursday the actual number of page views was only 5,000 views, then the data can be queried to obtain values associated with the dimension elements of each dimension of the metric (e.g., page views) to identify patterns established by the dimension elements and further to estimate what the values of each of the dimension elements should have been (e.g., expected values) on this Thursday.

Expected values are estimated (block 310). By using the queried data to identify the patterns in the behavior of the dimension elements of each dimension of the metric, the patterns can be used to estimate an expected behavior, since the expected behavior should follow the pattern. The estimated values can be determined using a principle of independence, which assumes that if no deviation exists between the control period and the anomaly period, then the actual values during the anomaly period will be the same as, or similar to, the expected values during the anomaly period. For example, it is assumed that the probability of a visitor being from country x during the control period is the same as the probability of the visitor being from country x during the anomaly period. This assumption is true if and only if the random variables (e.g., country and time period) are independent.

Deviations are calculated using comparable statistics (block 312). For example, different dimensions (e.g., channel, country of visitor, bounce rate) generally are not comparable since the basis of each dimension is different. However, converting the values into comparable statistics can enable a comparison between different dimensions, such as a comparison between the country of the visitor and the type of browser used by the visitor to access the website. The actual values, and the estimated expected values, for the dimension elements of each dimension of the metric during the anomaly period, are converted to proportions using various probabilities, examples of which are described in further detail below. In implementations, the deviations are determined by calculating the difference between the actual values and the estimated values for each dimension element of each dimension.

Once the deviations are calculated, the deviations are compared to identify contributing dimension elements as the sources of the changes in the metrics (block 314). For example, using the comparable statistics, converted values are compared with one another to identify which dimensions, or which dimension elements of which dimensions, contributed to the changes in the metric. In implementations, a relatively highest value of the converted values can represent a relatively highest deviation, which corresponds to a dimension element that contributed most to the changes in the metric. Consequently, the dimension elements corresponding to the highest converted values are identified as the primary sources of the changes in the metric.

An indication of the contributing dimension elements is communicated to a customer for campaign design (block 316). For example, a communication can be sent to the website owner that identifies the primary sources of the changes in the metric to enable the website owner to identify which factors (e.g., dimensions and/or dimension elements) contributed most to the changes in the metric. Accordingly, the website owner can adjust the campaign design accordingly.

Figure 4:
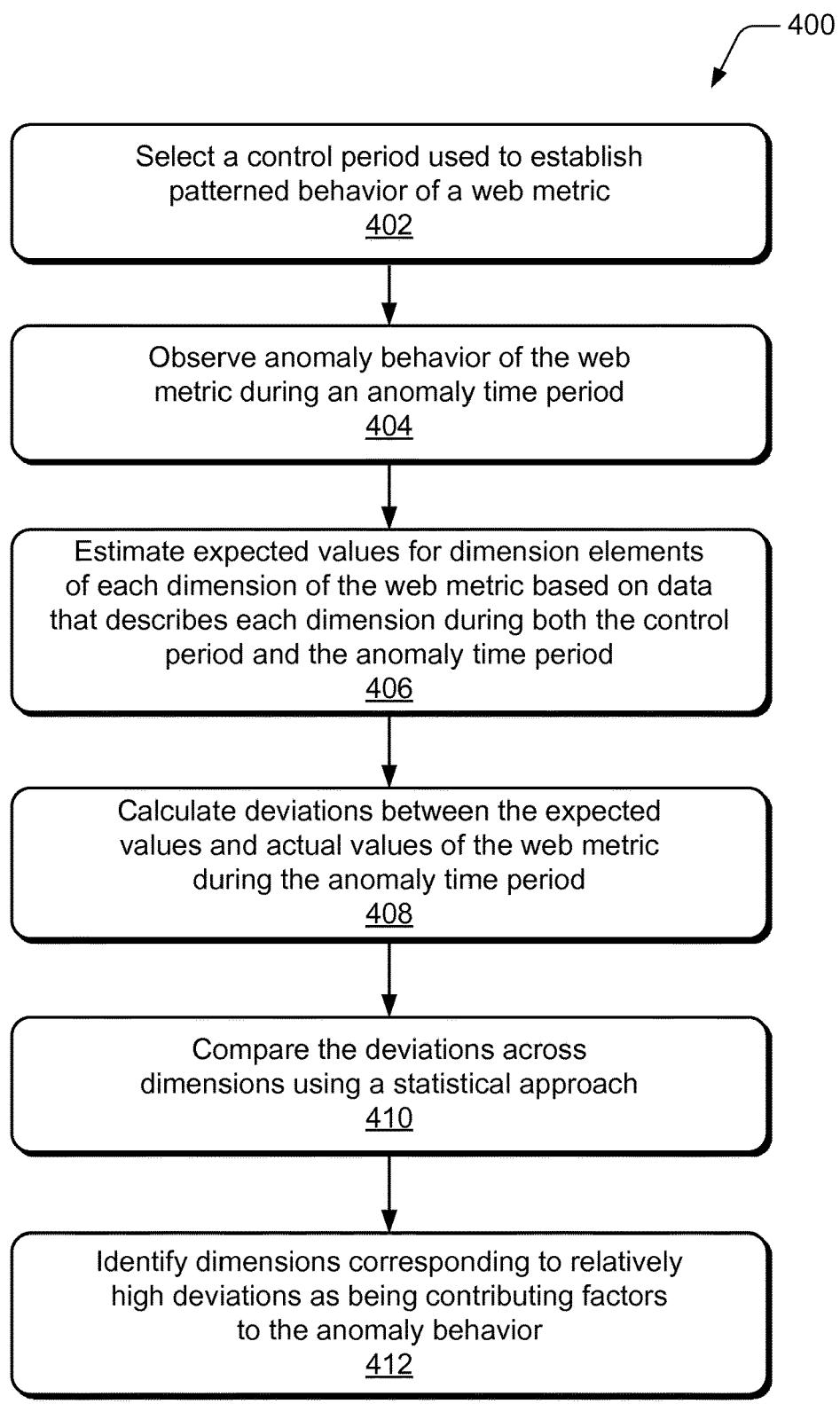
FIG. 4 is a flow diagram depicting a procedure in an example implementation in which techniques for automatic identification of sources of web metric changes are employed.

FIG. 4 is a flow diagram depicting a procedure 400 in an example implementation in which techniques for automatic identification of sources of web metric changes are employed. A control period used to establish patterned behavior of a web metric is selected (block 402). For example, the control period can include a time series in which a behavior of the web metric is established and expected to be the same or similar as a specific duration of time. For instance, on a given day, the time series can show that weekly seasonality is similar to the same weekday from past weeks. In implementations, the control period can provide a basis for estimating an expected behavior of the web metric during the specific duration of time.

Anomaly behavior of the web metric is observed during an anomaly time period (block 404). For example, anomaly behavior of the web metric includes a change in behavior of the web metric based on expected behavior established from the control period. In implementations, the anomaly behavior can be identified during a particular hour, day, month, and so on. Thus, the anomaly period includes a time duration in which the anomaly behavior occurs.

Expected values are estimated for dimension elements of each dimension of the web metric based on data that describes each dimension during both the control period and the anomaly period (block 406). For example, the expected values for the dimension elements of each dimension are calculated using values that represent each dimension element during the control period as well as actual values representing each dimension element during the anomaly period. Using the data from both the control period and the anomaly period can allow for improved performance in a finite data set.

Deviations are calculated between the expected values and the actual values of the dimension elements during the anomaly time period (block 408). For example, the deviations can be determined based on differences between the expected values for the dimension elements and the actual values of the dimension elements during the anomaly period, examples of which are described above.

The deviations are compared across dimensions using a statistical approach (block 410). For example, the deviations can be converted into proportions to enable comparison of unordered non-numeric values. In implementations, the conversion can include application of Pearson's Residual, which converts the values of the deviations into proportions associated with the anomaly behavior of the metric. These proportions can be used to assign scores to the dimension elements to determine an amount of contribution to the anomaly behavior by each dimension element. Further discussion of the application of Pearson's Residual is provided below. In implementations, the deviations can be compared to identify which deviations contributed most to the anomaly behavior of the web metric.

Dimensions and dimension elements corresponding to relatively high deviations are identified as being contributing factors to the anomaly behavior (block 412). This step can be performed in any suitable way. For example, the deviations can be ranked to identify top-ranked deviations and corresponding dimensions. In implementations, top-ranked deviations can be used to identify corresponding dimension elements of a particular dimension. For example, contributing factors to a significant increase in page views can be identified as a particular link posted on a social media site or a certain marketing campaign being run in Brazil. In an example, contributing factors to a significant decrease in page views may be identified as a removal of a link previously posted on a social media site, or a federal holiday in the United States. Accordingly, any of a variety of dimensions and/or dimension elements can be identified as contributing factors to the anomaly behavior of the web metric.

Calculating Deviations

The following discussion describes example techniques for calculating deviations for comparison in accordance with one or more implementations. The example techniques may be implemented via the environment 100 of FIG. 1, the system 500 of FIG. 5, and/or any other suitable environment. The example equations below present detailed ways of determining various values discussed in the procedures above in accordance with one or more implementations. In at least some implementations, the equations may be implemented via computer-executable logic, such as by the anomaly-source detection module 112.

Expected Values

In calculating the expected values of the dimensions and dimension elements of the web metric, a control period is selected (e.g., two weeks, Tuesdays of the past four weeks, between 6 pm and 9 pm on Fridays over the past six weeks, and so on). Table 1 illustrates a contingency table for page views by country according to a time series attribute.

TABLE 1

Contingency Table - Page Views by Country

| Time Series | Country | | | |
|---|---|---|---|---|
| | USA | Mexico | ... Canada | Column Total |
| Control Period | $c_1$ | $c_2$ | ... $c_n$ | $C = \Sigma c_i$ |
| Anomaly Period | $a_1$ | $a_2$ | ... $a_n$ | $A = \Sigma a_i$ |
| Total | $c_1 + a_1$ | $c_2 + a_2$ | ... $c_n + a_n$ | $C + A = \Sigma(c_i + a_i)$ |

Table 1 illustrates variables representing values of various dimension elements (e.g., USA, Mexico, Canada) of a dimension (e.g., Country) of a web metric (e.g., page views) over a time series (e.g., control period, anomaly period). For example, $c_1$ represents a number of page views in the USA during the control period, $c_2$ represents a number of page views in Mexico during the control period, and so on. The last column shows a summation of the control period values from $c_1$ to $c_n$. In addition, $a_1$ represents a number of actual page views in the USA during the anomaly period, $a_2$ represents a number of actual page views in Mexico during the anomaly period, and so on until $a_n$. The last column shows a summation of the anomaly period values from $a_1$ to $a_n$. The last row represents a summation of the number of page views for each respective country during the control period and the anomaly period, and the last column represents a summation of those values.

Independence of the two dimensions in Table 1 is used to estimate the expected value of each country during the anomaly period. For example, the principle of independence assumes that if there is no deviation between the control period and the anomaly period, then the distribution in the cells of Table 1 will reflect the distribution in the marginals of Table 1 (row and column sum distributions). If the distribution of page views across countries is the same for the control period and the anomaly period, then the following condition applies:

Prob(Visitor's Country=$j$|Time Series=Control)=Prob(Visitor's Country=$j$|Time Series=Anomaly)  Equation 1

Accordingly, Equation 1 states that the probability (e.g., "Prob") that the country of a visitor (e.g., "Visitor's Country") is country j during a control period (e.g., "Time Series=Control") is the same as the probability that a visitor will be from country j during an anomaly period (e.g., "Time Series=Anomaly"). This condition holds if and only if the two random variables, Country and Time Series, are independent.

In at least some implementations, the following equation can be used to represent the independence of Country and Time Series (by definition of independence, the null hypothesis of the contingency test):

Prob(Country=$j$ and Day=$i$)=$P_{ij}$=Prob(Country=$j$) *Prob(Day=$i$)  Equation 2

Accordingly, Equation 2 states that the probability that a visitor is from country j on a particular day i (e.g., "Country=j and Day=i") is represented by the term $P_{ij}$, which is also equal to the product of the probability that the visitor is from country j (e.g., "Prob(Country=j)") multiplied by the probability that the particular day is day i (e.g., "Prob(Day=i)").

Replacing the probabilities in Equation 2 with estimates results in the following equation:

$$P_{ij} = \frac{c_j + a_j}{C + A} * \frac{i}{C + A}, i \in \{Control, Anomaly\} \quad \text{Equation 3}$$

Consequently, the expected page views for the $j^{th}$ country during the anomaly period can be calculated by using:

$$e_j = P_{Aj} * (C + A) = \frac{c_j + a_j}{C + A} * A \quad \text{Equation 4}$$

Accordingly, the term $e_j$ represents the expected value (e.g., page views) for the $j^{th}$ country during the anomaly period. $P_{Aj}$ refers to $P_{ij}$ in Equation 3 where i (e.g., day or time series) is replaced with A (e.g., anomaly period). The term C refers to values obtained in Table 1, which include the summation of values for each country during the control period (e.g., "C=$\Sigma c_i$"). The term A refers to values obtained in Table 1, which include the summation of values for each country during the anomaly period (e.g., "A=$\Sigma a_i$"). The term $c_j$ refers to a particular country j during the control period, and $a_j$ refers to the particular country j during the anomaly period.

Comparable Statistics

Continuing with the above example, the expected value of page views can be calculated for all other dimensions, such as browser, channel, and so on. In addition, deviations from actual values can be calculated in each case. The deviation $d_{ki}$ of actual from expected for a $k^{th}$ dimension and its $i^{th}$ dimension element is given by the following equation:

$$d_{ki} = a_{ki} - e_{ki} \quad \text{Equation 5}$$

where $a_{ki}$ refers to the actual value for the $k^{th}$ dimension and its $i^{th}$ dimension element, and $e_{ki}$ refers the expected value for the $k^{th}$ dimension and its $i^{th}$ dimension element.

Once the deviations are calculated, the deviations can be compared across dimensions by using Pearson's Residual. The Pearson's Residual $P_{ki}$ for the $k^{th}$ dimension and its $i^{th}$ dimension element is given by the following equation:

$$P_{ki} = \frac{a_{ki} - e_{ki}}{\sqrt{e_{ki} * (1 - p_i) * (1 - p_a)}} \quad \text{Equation 6}$$

where $P_{ki}$ is equal to the deviation from Equation 5 over the square root of the sum.

The following is an example formula for calculating $p_i$ from Equation 6:

$$p_i = \frac{c_i + a_i}{C + A} \quad \text{Equation 7}$$

The following is an example formula for calculating $p_a$ from Equation 6:

$$p_a = \frac{A}{C + A} \quad \text{Equation 8}$$

The values for the terms in Equations 7 and 8 are described above with reference to Table 1. The Pearson's Residuals follow a standard normal distribution (taking positive or negative values) and are comparable across dimensions. For example, if the page views increased or decreased during the anomaly period, the set of top m dimension elements that contributed to the change in page views is given by the dimension elements with top or bottom m Pearson's Residuals, respectively.

Example System and Device

Figure 5:
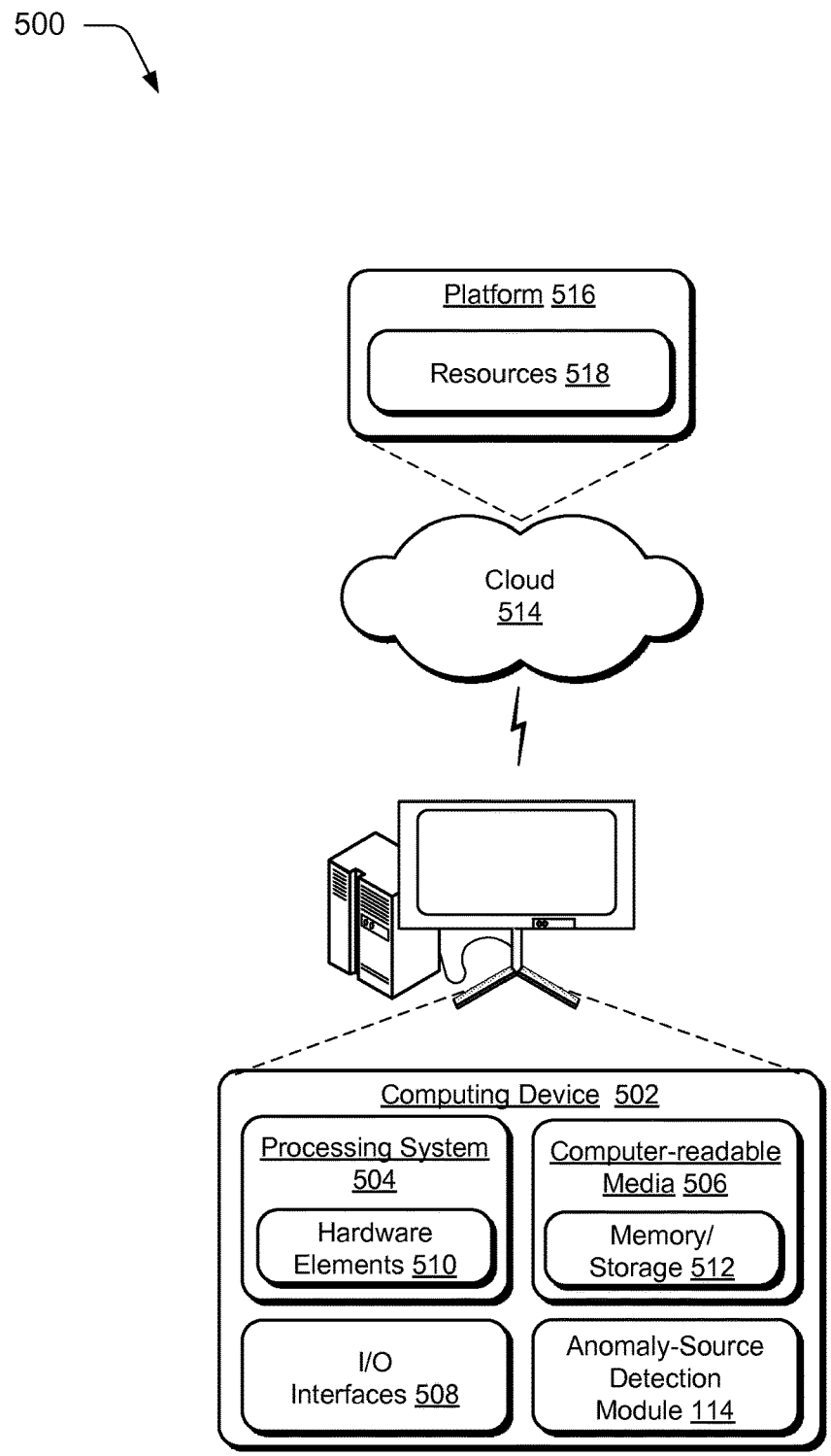
FIG. 5 illustrates various components of an example device that can be implemented as any type of computing device as described herein to implement the techniques described herein.

FIG. 5 illustrates an example system generally at 500 that includes an example computing device 502 that is representative of one or more computing systems and/or devices that may implement the various techniques described herein. This is illustrated through inclusion of anomaly-source detection module 112, which may be configured to identify contributing factors to anomaly behavior detected in a web metric associated with a website. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interface 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware element 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 506 is illustrated as including memory/storage 512. The memory/storage 512 represents memory/storage capacity associated with one or more computer-readable media. The memory/storage component 512 may include volatile media (such as random access memory (RAM)) and/or nonvolatile media (such as read only memory (ROM), Flash memory, optical disks, magnetic disks, and so forth). The memory/storage component 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable storage media and/or hardware elements 510 of the processing system 504. The instructions and/or functions may be executable/operable by one or more articles of manufacture (for example, one or more computing devices 502 and/or processing systems 504) to implement techniques, modules, and examples described herein.

The techniques described herein may be supported by various configurations of the computing device 502 and are not limited to the specific examples of the techniques described herein. This functionality may also be implemented all or in part through use of a distributed system, such as over a "cloud" 514 via a platform 516 as described below.

Cloud 514 includes and/or is representative of a platform 516 for resources 518. Platform 516 abstracts underlying functionality of hardware (e.g., servers) and software resources of the cloud 514. Resources 518 may include applications and/or data that can be utilized while computer processing is executed on servers that are remote from the computing device 502. Resources 518 can also include services 520 provided over the Internet and/or through a subscriber network, such as a cellular or Wi-Fi network.

Platform 516 may abstract resources and functions to connect computing device 502 with other computing devices. Platform 516 may also serve to abstract scaling of resources to provide a corresponding level of scale to encountered demand for resources 518 that are implemented via platform 516. Accordingly, in an interconnected device embodiment, implementation of functionality described herein may be distributed throughout system 500. For example, the functionality may be implemented in part on computing device 502 as well as via platform 516 that abstracts the functionality of cloud 514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device to report sources contributing to changes in web metrics via web analytics tools, the method comprising:
   determining one or more changes in a web metric that indicates a measurable attribute associated with a website;
   identifying sources that contributed to the one or more changes in the web metric by at least:
   querying data to obtain actual values for dimension elements along a plurality of dimensions of the web metric during a time duration when the one or more changes occurred;
   estimating expected values for the dimension elements along the plurality of dimensions of the web metric during the time duration when the one or more changes occurred, the expected values being estimated based on patterns established in historical data;
   calculating deviations between the actual values and the expected values;
   determining relative amounts respective dimension elements of different dimensions of the plurality of dimensions contribute to the one or more changes in the web metric, a relative amount a respective dimension element contributes to the one or more changes in the web metric being comparable to the relative amounts other respective dimension elements contribute to the one or more changes in the web metric, and the relative amounts determined by computing comparable statistics for the respective dimension elements as a function of one or more standard normal distributions of the deviations; and
   analyzing the relative amounts the respective dimension elements of the different dimensions contribute to the one or more changes in the web metric to identify corresponding dimension elements as the sources that contributed to the one or more changes in the web metric; and causing display of the identified sources via a user interface of a web analytics tool.

2. A method as recited in claim 1, further comprising querying historical data over an additional time duration to obtain historical values for the dimension elements along the plurality of dimensions of the web metric and establish at least one pattern associated with the dimension elements.

3. A method as recited in claim 2, wherein the additional time duration includes a same weekday from at least one past week when the web metric is seasonal.

4. A method as recited in claim 1, further comprising estimating additional expected values for at least one additional dimension having a plurality of dimension elements associated with the web metric.

5. A method as recited in claim 1, further comprising identifying an amount contributed by respective dimension elements.

6. A system, comprising: one or more processors; and a memory having instructions that are executable by the one or more processors to implement an anomaly-source detection module that is configured to:
analyze values associated with a plurality of categorical variables corresponding to a web metric that indicates a measurable attribute associated with a website;
determine deviations between expected values and actual values associated with respective categorical variables for a particular time duration, the expected values being estimated based on patterns identified in historical data corresponding to the plurality of categorical variables over a control period of time, the actual values being collected during the particular time duration;
convert the deviations into comparable statistics for the respective categorical variables as a function of one or more standard normal distributions of the deviations;
compare relative amounts the respective categorical variables contribute to a change in the web metric based on conversion of the deviations into the comparable statistics;
use the compared relative amounts to identify the plurality of categorical variables that correspond to sources of the change in the web metric; and
generate a user interface of a web analytics tool in part, by configuring the user interface to include indications of the sources of the change based on the identified categorical variables.

7. A system as recited in claim 6, wherein the identified categorical variables corresponding to sources of the change in the web metric are identified by: ranking the relative amounts; and determining which of the plurality of categorical variables corresponds to top-ranked relative amounts.

8. A system as recited in claim 6, wherein the expected values are determined using a principle of independence that is based on a probability that the plurality of categorical variables have same values during the control period of time and the particular time duration.

9. A system as recited in claim 6, wherein the control period of time includes a day or time period during previous weeks that is the same as a day or time period associated with the particular time duration.

10. A system as recited in claim 6, wherein the anomaly-source detection module is further configured to estimate the expected values associated with the respective categorical variables using the historical data over the control period of time and the actual values during the particular time duration.

11. A system as recited in claim 6, wherein the plurality of categorical variables includes at least one of a country associated with a visitor to the website, a browser type used by the visitor to access the website, a visit origination channel of the visitor, or an operating system used by the visitor.

12. A system as recited in claim 6, wherein the change in the web metric includes a decrease or increase in page views of the web site that exceeds a threshold.

13. Non-transitory Computer-readable storage media comprising stored instructions that are executable by a computing device to implement an anomaly-source detection module configured to perform operations comprising:
determining a plurality of dimensions of a web metric that indicates a 10 measurable attribute associated with a website, one or more said dimensions having a plurality of dimension elements;
collecting data that indicates an actual distribution of values corresponding to the plurality of dimension elements of the one or more said dimensions during a particular duration of time;
estimating an expected distribution of the values corresponding to the plurality of dimension elements of the one or more said dimensions that are expected during the particular duration of time based on historical data;
applying a statistical algorithm to calculate deviations between the expected distribution and the actual distribution of the values;
assigning scores to respective dimension elements that indicate a relative amount a respective dimension element contributes to a change in the web metric, the relative amount a respective dimension element contributes to the change being comparable to relative amounts other respective dimension elements contribute to the change in the web metric, and the scores determined based on comparable statistics for the respective dimension elements computed as a function of one or more standard normal distributions of the deviations;
identifying at least one source of the change in the web metric based on a comparison of the scores and identification of which said dimension elements correlate to the scores; and
generating a user interface of a web analytics tool in part, by configuring the user interface to include an indication of the at least one source of the change.

14. Non-transitory Computer-readable storage media as recited in claim 13, wherein the expected distribution of the values corresponding to the plurality of dimension elements utilizes a time period over which the historical data is queried to obtain actual values for each said dimension element and corresponding dimension.

15. Non-transitory Computer-readable storage media as recited in claim 13, wherein the at least one source of the change in the web metric includes a respective dimension element associated with a relatively highest score from among the scores.

16. Non-transitory Computer-readable storage media as recited in claim 13, wherein the change in the web metric includes a decrease or increase in revenue generated via the website that exceeds a threshold.

17. Non-transitory Computer-readable storage media as recited in claim 13, wherein the at least one source of the change in the web metric includes a respective dimension element indicative of at least one of a country associated with a visitor to the web site, a browser type used by the visitor to access the website, a visit origination channel of the visitor, or an operating system used by the visitor.

18. Non-transitory Computer-readable storage media as recited in claim 13, wherein the expected distribution of the values corresponding to the plurality of dimension elements is estimated using proportions of the change contributed by each of the plurality of dimension elements.

19. Non-transitory Computer-readable storage media as recited in claim 13, wherein the scores assigned to respective dimension elements are based on a standard normal distribution that allows comparison across different dimensions and dimension elements.

20. A method as recited in claim 1, wherein a set of top dimension elements that contributed to the one or more changes in the web metric corresponds to the dimension elements with a top or a bottom assigned score, the assigned score based, in part, on the comparable statistics.

* * * * *